(12) United States Patent
Choi et al.

(10) Patent No.: US 8,792,603 B2
(45) Date of Patent: *Jul. 29, 2014

(54) APPARATUS AND METHOD FOR ACQUIRING SYNCHRONIZATION IN WIRELESS COMMUNICATION SYSTEM

(75) Inventors: Eun Young Choi, Daejeon-Si (KR); Hun Sik Kang, Daejeon-Si (KR); Sok Kyu Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 237 days.

This patent is subject to a terminal disclaimer.

(21) Appl. No.: 13/333,707

(22) Filed: Dec. 21, 2011

(65) Prior Publication Data

US 2012/0164957 A1    Jun. 28, 2012

(30) Foreign Application Priority Data

Dec. 23, 2010   (KR) ........................ 10-2010-0133439

(51) Int. Cl.
*H04L 7/00* (2006.01)
(52) U.S. Cl.
USPC ........................................... 375/368; 375/354
(58) Field of Classification Search
USPC ..................... 375/326, 327, 340, 354, 368
See application file for complete search history.

(56) References Cited

U.S. PATENT DOCUMENTS

| | | | |
|---|---|---|---|
| 5,477,103 A * | 12/1995 | Romano et al. ............... | 318/601 |
| 5,539,914 A * | 7/1996 | Fry et al. ........................... | 710/7 |
| 2004/0105423 A1* | 6/2004 | Koehler et al. ............... | 370/351 |
| 2007/0297521 A1* | 12/2007 | Guo et al. ..................... | 375/260 |
| 2008/0219134 A1* | 9/2008 | Cherubini et al. ............ | 369/126 |
| 2011/0161714 A1* | 6/2011 | Glass ............................ | 713/400 |
| 2012/0163367 A1* | 6/2012 | Choi et al. .................... | 370/350 |

* cited by examiner

*Primary Examiner* — Emmanuel Bayard
(74) *Attorney, Agent, or Firm* — Nelson Mullins Riley & Scarborough LLP

(57) ABSTRACT

An apparatus for acquiring synchronization in a multi-channel system includes a signal reception unit for receiving information about repetition patterns of signal streams for each channel and receiving the signal streams and data from the channel, an estimated synchronization point tracking unit for determining a estimated synchronization point for the channel from a point of time where the repetition patterns are ended by tracking a period where the signal streams are repeated based on the repetition patterns, and a synchronization acquisition unit for searching, based on the estimated synchronization point related to the channel, for a point where the repetition of the signal stream is ended or a point where new signal streams are started and acquiring a synchronization point based on the point.

19 Claims, 8 Drawing Sheets

APPARATUS AND METHOD FOR ACQUIRING SYNCHRONIZATION IN WIRELESS COMMUNICATION SYSTEM

Priority to Korean patent application number 10-2010-0133439 filed on Dec. 23, 2010, the entire disclosure of which is incorporated by reference herein, is claimed.

BACKGROUND OF THE INVENTION

1. Field of the Invention

The present invention relates to wireless communication and, more particularly, to an apparatus and method for acquiring synchronization in a wireless communication system.

2. Discussion of the Related Art

In a wireless communication system (for example, a wireless LAN wireless system), synchronization for a receiver is provided by transmitting signal streams having repetition patterns known to both a transmission stage and a reception stage. The receiver can estimate the signal streams of repetition patterns, calculates a maximum value from among values obtaining by correlating the current known current signal and a shifted signal, and acquire the synchronization of a frame when the maximum value is a certain value or higher. If a value in which the signal stream already known to the receiver is matched with an actually received signal stream is a predetermined level or higher, a synchronization time can be found. In other words, a pattern of the already known signal stream is matched with the signal stream received by the receiver, which is used for synchronization.

Meanwhile, channels used in a system have various forms, such as a single channel and multiple channels. In the case where each channel is used to transmit a piece of information, a receiver finds one synchronization point using pieces of information of the channels at the same time. In case of a system that has to acquire a synchronization point for each channel (that is, a system having independent synchronization for every channel), a receiver uses separate synchronization for every channel in order to improve the efficiency of resource management. However, if the same repetition pattern is used for every channel for the purpose of synchronization, a computational load in the receiver is increased according to an increase in the number of channels in the case where a signal known using the existing method is matched with a received signal. Furthermore, if a different repetition pattern is used for synchronization for every channel, it will place a heavy load on the receiver.

Accordingly, there is a need for an efficient apparatus and method for acquiring synchronization in a multi-channel environment.

SUMMARY OF THE INVENTION

It is an object of the present invention to provide an apparatus and method for acquiring synchronization by using the periodicity of signal streams received by a receiver in a multi-channel system.

It is another object of the present invention to provide an apparatus and method for acquiring synchronization by searching for the end of signal streams having the same periodicity in a multi-channel system.

It is yet another object of the present invention to provide an apparatus and method for acquiring synchronization by using a correlation between a signal received in a current period and a signal received in a next period when received signal streams have periodicity in a multi-channel system.

It is still yet another object of the present invention to provide an apparatus and method for acquiring synchronization by comparing the sum of a signal received in a current period and a signal received in a next period and the difference between them in a multi-channel system.

According to an aspect of the present invention, there is provided an apparatus for acquiring synchronization in a multi-channel system which includes a signal reception unit for receiving information about repetition patterns of signal streams for each channel and receiving the signal streams and data from the channel, an estimated synchronization point tracking unit for determining a estimated synchronization point for the channel from a point of time where the repetition patterns are ended by tracking a period where the signal streams are repeated based on the repetition patterns, and a synchronization acquisition unit for searching, based on the estimated synchronization point related to the channel, for a point where the repetition of the signal stream is ended or a point where new signal streams are started and acquiring a synchronization point based on the point.

The information about the repetition patterns of the signal streams may comprise information, informing a specific periodicity in case where the signal streams in the channel are repeatedly transmitted with the specific periodicity.

The estimated synchronization point tracking unit may calculate, during the period, an add-sum of the signal streams, a sub-sum of the signal streams, and an add-sub-sum that is a difference between the add-sum and the sub-sum and tracks the estimated synchronization point for the channel by comparing the sub-sum and the add-sub-sum.

The estimated synchronization point tracking unit may determine whether the sub-sum has a positive slope, increase a slope count for a channel having the positive slope by 1, and determine a point of time where the sub-sum is identical to the add-sub-sum as the estimated synchronization point.

The signal streams may comprise Short Training Fields (STFs).

The new signal streams may comprise Long Training Fields (LTFs).

The synchronization acquisition unit may determine a point of time where a process of the data for the channel is started based on the acquired synchronization point.

The synchronization acquisition unit may further comprise a buffer for storing data for the channel until the synchronization point is acquired.

According to another aspect of the present invention, there is provided a method of acquiring synchronization in a multi-channel system which includes receiving information about repetition patterns of signal streams for each channel, receiving the signal streams from the channel, determining an estimated synchronization point for the channel from a point of time where the repetition patterns are ended by tracking a period where the signal streams are repeated based on the repetition patterns, and acquiring a synchronization point by searching, based on the estimated synchronization point related to the channel, for a point where the repetition of the signal stream is ended or a point where new signal streams are started.

The information about the repetition patterns of the signal streams may comprise information, informing a specific periodicity in case where the signal streams in the channel are repeatedly transmitted with the specific periodicity.

The method may further comprises calculating, during the period, an add-sum of the signal streams, a sub-sum of the signal streams, and an add-sub-sum that is a difference between the add-sum and the sub-sum.

The estimated synchronization point for the channel may be determined by comparing the sub-sum and the add-sub-sum.

Then a slope count for a channel with the sub-sum having a positive slope is increased by 1, a point of time where the sub-sum is identical to the add-sub-sum may be determined as the estimated synchronization point.

The signal streams may comprise STFs.

The new signal streams may comprise LTFs.

A point of time where a process of the data for the channel is started may be determined based on the acquired synchronization point.

The method may further comprises storing data for the channel until the synchronization point is acquired.

The add-sum may be an add-sum of power of the signal streams and the sub-sum is a sub-sum of power of the signal streams.

According to another aspect of the present invention, there is provided a method of acquiring synchronization in a multi-channel system which includes receiving signal streams from a plurality of stations through different channels, wherein the channels of the stations have different repetition patterns of the signal streams, calculating, during one period, an add-sum of the signal streams repeated, a sub-sum of the signal streams repeated, and an add-sub-sum that is a difference between the add-sum and the sub-sum, determining a point of time where any one of the add-sum and the sub-sum is identical to the add-sub-sum as a estimated synchronization point, while calculating the add-sum, the sub-sum, and the add-sub-sum whenever the signal stream is received, acquiring a first point where the repetition of the signal streams is ended or a second point where new signal streams are started based on the estimated synchronization point, and acquiring a synchronization point for a processing of data, received from the plurality of stations, based on the first point or the second point.

The information about the repetition patterns of the signal streams may comprise information about the channel.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In order to clarify a description of the present invention, a description of parts not related to the description is omitted, and the same reference numbers are used throughout the drawings to refer to the same or like parts.

Furthermore, when it is said that a part "includes (or comprises)" any constituent element, it means the part may further include other constituent elements unless otherwise described without excluding other constituent elements. In addition, the term " . . . unit" described in the specification means a unit for processing at least one function or operation, and it may be implemented by hardware or software or a combination of hardware and software.

The embodiments of the present invention will now be described with reference to the accompanying drawings.

In a multi-channel system, one station (or receiver) can receive signals from several stations (or transmitters) and process the signals using one decoder. In this case, channels have to be synchronized with each other. However, each of the channels may have a different synchronization point for each of the signals received from different stations (or transmitters). Accordingly, the receiver has to acquire the synchronization point for every channel and process the data received in parallel at the same time.

Figure 1:
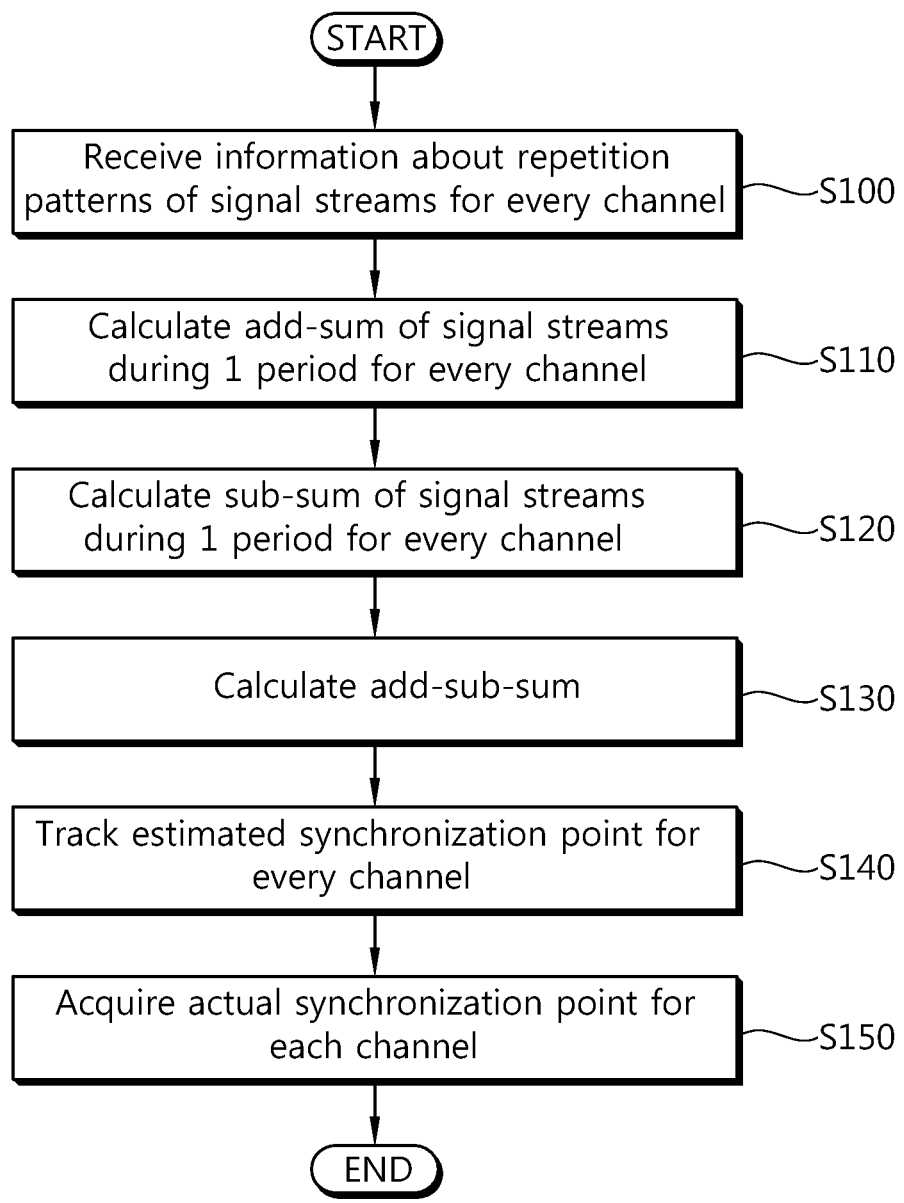
FIG. 1 is a flowchart illustrating a method of acquiring synchronization according to an embodiment of the present invention.

FIG. 1 is a flowchart illustrating a method of acquiring synchronization according to an embodiment of the present invention.

Referring to FIG. 1, a receiver receives information about the repetition patterns of signal streams for each channel from a transmitter at step S100. The information about the repetition patterns of the signal streams is information about the periodicity of a signal. Unlike in a single channel system, in a multi-channel system, different users can receive data through different channels. Accordingly, system synchronization for the data may be different for every channel. If signal streams have the same repetition pattern for every channel, information about one repetition pattern is applied to all the channels. However, if signal streams have different repetition patterns for every channel, information about a repetition pattern for each channel has to be obtained from a transmitter.

A process of receiving information about a repetition pattern of signal streams may be performed in a Request To Send (RTS)/Clear To Send (CTS) process. For example, in the case where a transmitter has data to be transmitted, the transmitter performs the RTS/CTS process (that is, information transfer process) in order to prevent a collision between hidden nodes. The transmitter may inform information about the repetition patterns of signal streams for each channel in the RTS/CTS process. If periodicity is already determined for every channel, independent periodicity may be used for every channel.

The receiver calculates the add-sum A of signal streams during one period in each channel at step S110. The one period includes a plurality of repeated signal streams. For example, in the case where one period consists of 16 repeated signal streams, the add-sum of signal streams during one period means the add-sum of the 16 repeated signal streams. The signal stream is information known to both a transmitter and a receiver and is used for the detection of an initial signal, control of a signal gain, the estimation and compensation of a frequency offset, the detection of a system synchronization time. The signal streams are repeated with periodicity. For example, in systems, such as IEEE 802.11a/n, ten Short Training Fields (hereinafter referred to as STFs) and two Long Training Fields (hereinafter referred to as LTFs) are attached to the starting end of a signal stream.

For example, the add-sum of signal streams during one period may be the add-sum of pieces of power of each signal stream. In this case, the add-sum may be calculated using the following equation.

$$\text{add-sum} = \Sigma (r_n + r_{n-p})^2 \qquad \text{[Equation 1]}$$

In the add-sum, $r_n$ is an $n^{th}$ signal stream, and p indicates the number of signal streams or the length of one period constituting the add-sum. $r_n$ and $r_{n-p}$ indicate reception data corresponding to the same position within one period at an interval of one period. All data having a repetition pattern and data having a previous pattern during one period are summed by adding a current reception signal $r_n$ to a reception signal $r_{n-p}$ before one period.

For another example, the add-sum of signal streams during one period may be an absolute value of the add-sum of intensities (for example, SNRs) of each signal stream. In this case, the add-sum may be calculated using the following equation.

$$\text{add-sum} = \Sigma |r_n + r_{n-p}| \qquad \text{[Equation 2]}$$

Meanwhile, a receiver cumulatively calculates the add-sum of signal streams during one period as the signal streams flow. Here, the signal stream means the add-sum of a currently received signal stream and a signal stream received before one period. That is, data at the same position is added at an interval of one period, and the add-sum is accumulated for one period. After one period elapses at the time of accumulation, a next signal is received, and the value of a new sum except the first cumulative value is used. For example, assuming that 16 identical signal streams are repeated during one period, after the sixteenth signal stream is received, a receiver cumulatively sums up the first signal stream of a second next period, but excludes the first signal stream of a first previous period from the add-sum. According to this method, whenever a signal stream is received, the add-sum will always become the add-sum of signal streams during one period.

The receiver calculates the sub-sum B of the signal streams during the same one period in each channel at step S120. As in the method of calculating the add-sum, the sub-sum B is calculated by using a cumulative difference between signal streams during one period. The sub-sum can be calculated using Equation 3 or Equation 4 below.

$$\text{sub-sum} = \Sigma (r_n - r_{n-p})^2 \qquad \text{[Equation 3]}$$

$$\text{sub-sum} = \Sigma |r_n - r_{n-p}| \qquad \text{[Equation 4]}$$

When the add-sum and the sub-sum are accumulated during one period, the add-sum and the sub-sum maintain respective certain amount A and B according to a lapse of time (A>B).

The step S120 is shown to be later than the step S110, but is only illustrative. There is no limit to the sequence. That is, the steps S110 and S120 may be performed at different times. The step S120 may be first performed and the step S110 may be then performed or the steps S110 and S120 may be performed at the same time, according to circumstances.

The receiver calculates an add-sub-sum C which is a difference between the add-sum and the sub-sum of the signal streams during the same one period in each channel at step S130. The add-sub-sum may be calculated using Equation 5 below.

$$\text{add-sub-sum} = (\text{add-sum}) - (\text{sub-sum}) \qquad \text{[Equation 5]}$$

The receiver tracks an estimated synchronization point for each channel by comparing and analyzing the add-sum, the sub-sum, and the add-sub-sum of the signal streams during the one period at step S140. The estimated synchronization point may be tracked using the following method. For example, the receiver may use a point of time at which the add-sum is identical to the sub-sum as the estimated synchronization point. If signal streams having a different characteristic from the same signal stream repeated are cumulatively added, the amounts of the add-sum and the sub-sum are changed. For example, the add-sum may be decreased from an amount A with a negative slope, and the sub-sum may be increased from an amount B with a positive slope. In this case, the receiver can estimate that signal streams of the same pattern are ended and signal streams of a new form are started, at a point of time at which a final value where the add-sum has been decreased is identical to a final value where the sub-sum has been increased. Accordingly, the receiver can estimate the estimated synchronization point on the basis of the above point of time.

For another example, the receiver may use a point of time at which the sub-sum and the add-sub-sum are identical to each other as the estimated synchronization point.

The receiver acquires an actual synchronization point for each channel on the basis of the estimated synchronization point, acquired for each channel, and a slope count at step S150. Synchronization may be acquired on the basis of the start or end point of signal streams having a new characteristic. A system may become less sensitive to a fading channel by searching for the end point of signal streams having the same periodicity using signal streams received as described above. A method of acquiring an actual synchronization point on the basis of an estimated synchronization point is described below.

Figure 2:
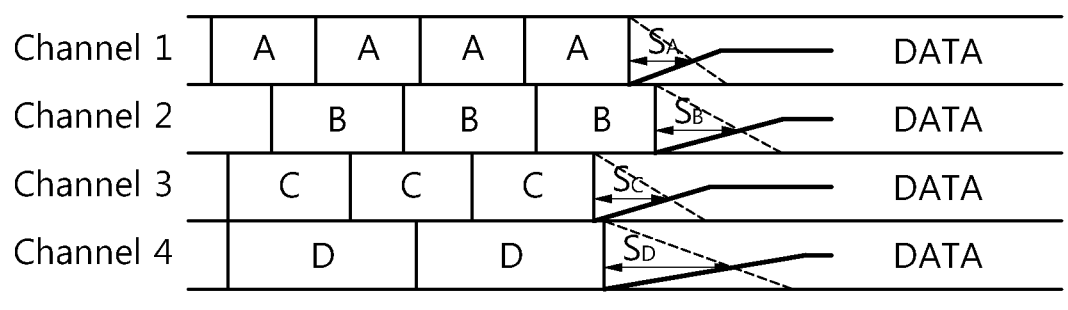
FIG. 2 is an explanatory diagram illustrating a process of tracking an estimated synchronization point in each channel according to an embodiment of the present invention.

FIG. 2 is an explanatory diagram illustrating a process of tracking an estimated synchronization point in each channel according to an embodiment of the present invention. A frame structure in a wireless LAN system is illustrated in FIG. 2. However, the frame structure is not limited to the wireless LAN system, but may be applied to systems having a frame structure with the same repeated signal streams.

Referring to FIG. 2, a receiver receives repetition pattern signal streams and data through four channels. A channel 1 transmits repetition patterns A and data, a channel 2 transmits repetition patterns B and data, a channel 3 transmits repetition patterns C and data, and a channel 4 transmits repetition patterns D and data. The repetition patterns A, B, C, and D may be identical or different from each other. That is, the channels may have different periodicities or the same periodicity.

The receiver cumulatively calculates the add-sum and the sub-sum of signal streams according to the repetition patterns A in the channel 1 on the basis of the period A and calculates the add-sub-sum between the add-sum and the sub-sum. In the channel 1, the sub-sum and the add-sub-sum become close to each other from a point of time where the repetition patterns A are ended and become identical to each other after a lapse of a slope count or a sample number $S_A$.

Likewise, the receiver calculates the add-sum, the sub-sum, and the add-sub-sum of the signal streams according to each of the repetition patterns B, C, and D in the channels 2, 3, and 4 and tracks sample numbers $S_B$, $S_C$, and $S_D$ in each of which the sub-sum and the add-sub-sum become identical to each other by comparing and analyzing the add-sum, the sub-sum, and the add-sub-sum of signal streams as in the channel 1. Here, the sample numbers $S_A$, $S_B$, $S_C$, and $S_D$ become respective estimated synchronization points in the channels 1, 2, 3, and 4.

After searching for the estimated synchronization points in the respective channels, the receiver finds the end point of the repetition pattern based on the estimated synchronization point and determines the last synchronization point by searching for the start point of an actual data part on the basis of the end point. Furthermore, the receiver synchronizes all the channels and uses the data.

Figure 3:
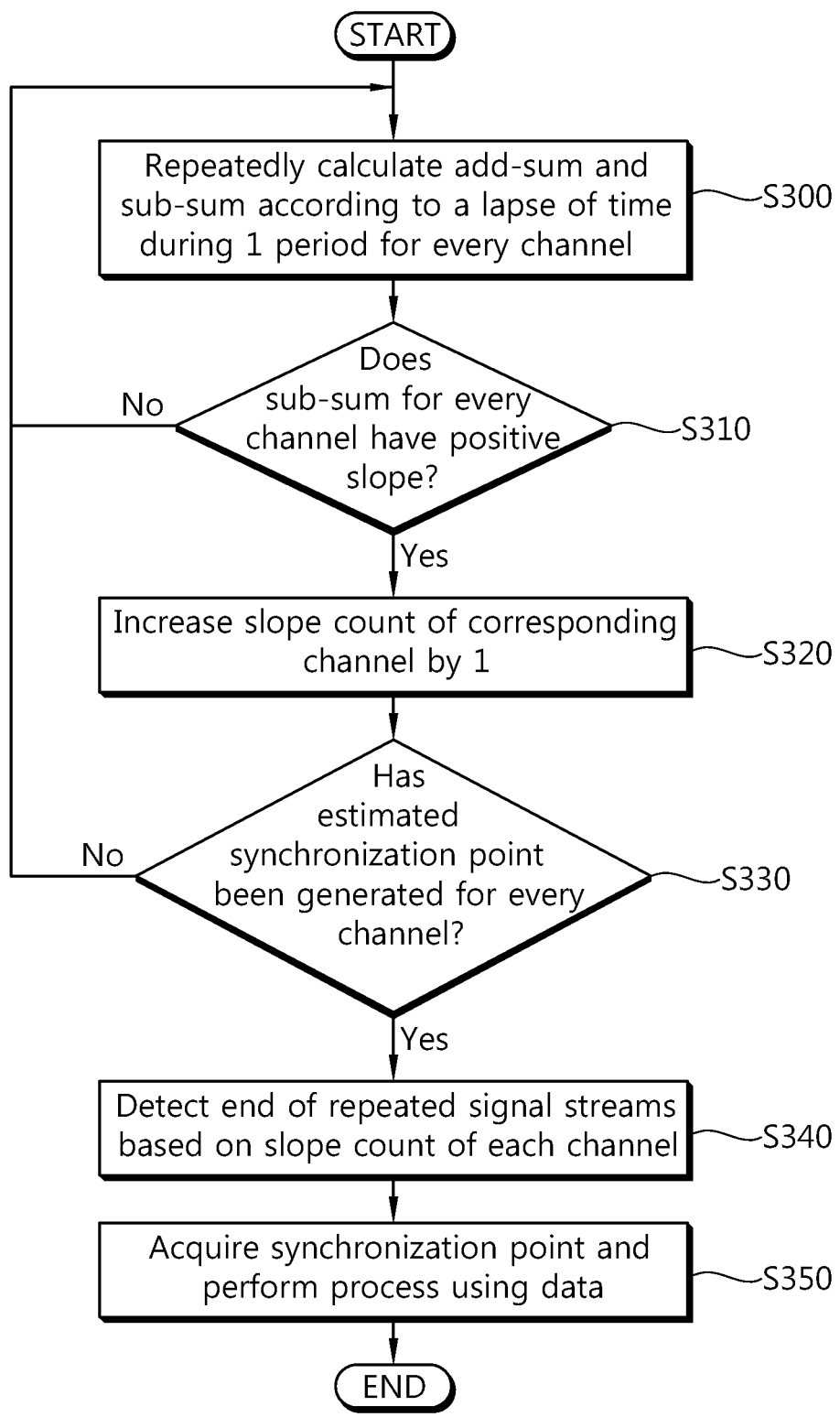
FIG. 3 is a flowchart illustrating a method of acquiring synchronization according to another embodiment of the present invention.

FIG. 3 is a flowchart illustrating a method of acquiring synchronization according to another embodiment of the present invention.

Referring to FIG. 3, a receiver repeatedly calculates a cumulative add-sum and a cumulative sub-sum of signal streams according to a lapse of time during one period for every channel and an add-sub-sum between the add-sum and the sub-sum at step S300. It is assumed that the receiver already knows the repetition patterns of signal streams for each channel. The repetition patterns in a plurality of the channels may be identical to each other or different from each other. Furthermore, the phrase 'to cumulatively calculate the add-sum and the sub-sum during one period according to a lapse of time' is the same as described above in steps S100 and S110 of FIG. 1.

The receiver determines whether the sub-sum of each channel has a positive slope according to a lapse of time at step S310. If, as a result of the determination, the sub-sum of each channel is determined not to have a positive slope, the receiver cumulatively calculates an add-sum and a sub-sum according to a lapse of time during one period for every channel at step S300. If, as a result of the determination, the sub-sum of each channel is determined to have a positive slope, the receiver increases a slope count regarding the corresponding channel by 1 at step S320. Assuming that there are channels A, B, C, and D, slope counts for the respective channels may be $S_A$, $S_B$, $S_C$, and $S_D$. The slope count is increased by 1 when the sub-sum calculated every time has a positive slope.

Next, the receiver determines whether an estimated synchronization point has occurred in each channel at step S330. For example, the estimated synchronization point may become a point of time where the sub-sum and the add-sub-sum calculated every time become identical to each other. If, as a result of the determination at step S330, the estimated synchronization point is determined not to have occurred in the corresponding channel, the receiver cumulatively calculates the add-sum, the sub-sum, and the add-sub-sum of the corresponding channel according to a lapse of time during one period at step S300.

If, as a result of the determination at step S330, the estimated synchronization point is determined to have occurred in the corresponding channel, the receiver finds a point where the repetition signal streams are ended and a point where new signal streams are ended on the basis of the estimated synchronization point and the slope count of the corresponding channel at step S340. For example, assuming that in a channel A, a slope count in an estimated synchronization point is $S_A$ and new signal streams are LTF CP, and LTF1, a point where the new signal stream LTF1 is ended (that is, the end of LTF1) may be calculated using Equation 6 below.

end of LTF1=LTF1+LTF $CP-S_A$

After the start or end point of a signal stream is found as described above, the receiver may acquire synchronization regarding the corresponding channel on the basis of the start or end point and perform processing for data received from each of the channels.

If the receiver acquires a synchronization point regarding all the channels, the receiver performs a process using next data on the basis of synchronization information about each channel at step S350.

Figure 4:
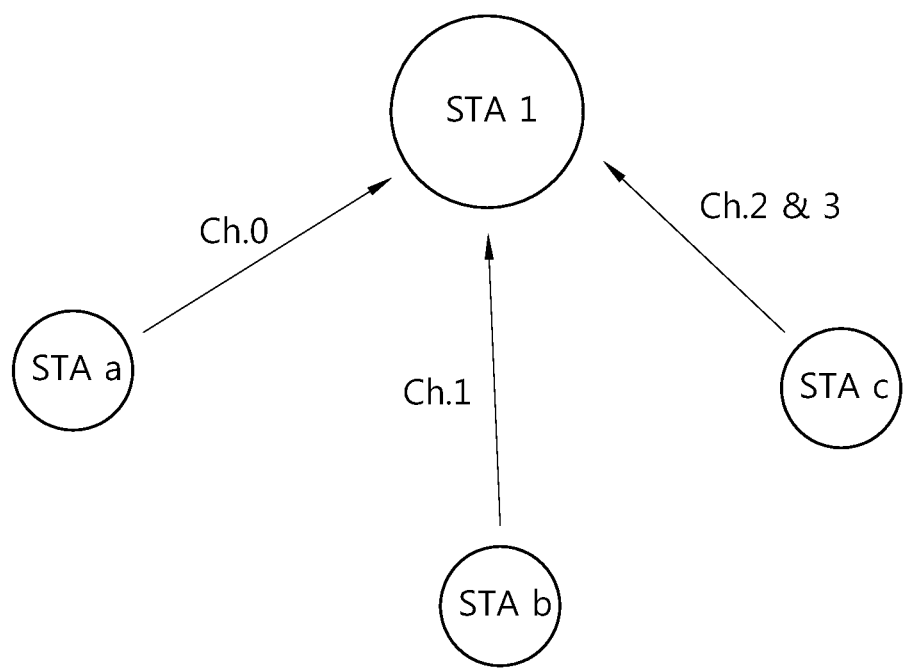
FIG. 4 is a diagram showing channels between a transmitter and a receiver according to an embodiment of the present invention.

FIG. 4 is a diagram showing channels between a transmitter and a receiver according to an embodiment of the present invention.

Referring to FIG. 4, a station STA 1 receives data from a station STA a through a channel Ch. 0, data from a station STA b through a channel Ch. 1, and data from a station STA c through channels Ch. 2 & 3 at the same time. That is, the station STA 1 receives the data through a total of the four channels. It is here assumed that the channels of the stations STA a, STA b, and STA c are the same as those of FIG. 5 and signal streams have the same repetition pattern for every channel.

Figure 5:
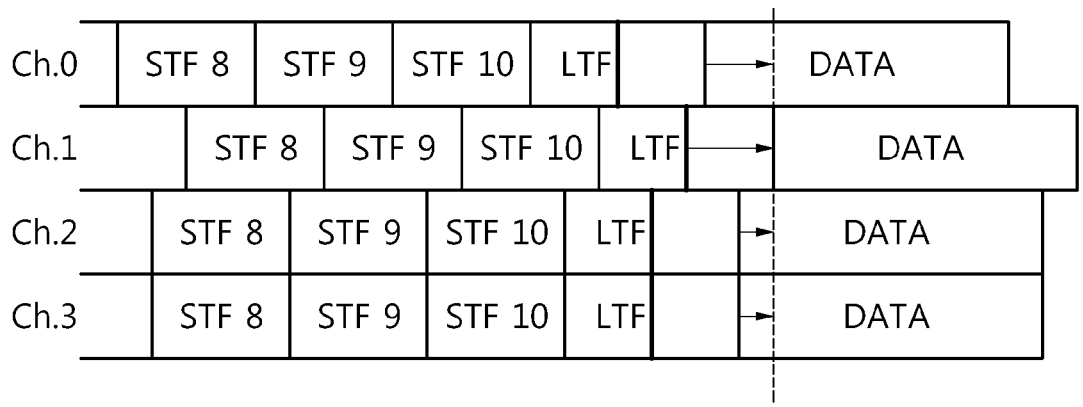
FIG. 5 is a conceptual diagram illustrating a scenario for acquiring the synchronization points of data received through a plurality of channels according to an embodiment of the present invention.

In FIG. 5, the station STA 1 cumulatively calculates an add-sum, a sub-sum, and an add-sub-sum according to a lapse of time during one period for every channel and tracks an estimated synchronization point by comparing and analyzing the add-sum, the sub-sum, and the add-sub-sum. If the repetition pattern of the signal stream is ended at a STF10 in each channel, the station STA 1 can find Estimated synchronization points (ESPs) 1, 2, 3, and 4 for the respective channels in LTF sections. The station STA 1 finds a synchronization point before a data part which is used after actual synchronization.

In the sequence of synchronization detected, after synchronization of the channel Ch. 0 is detected, synchronization of the channel Ch. 2 and the channel Ch. 3 are detected, and synchronization of the last channel Ch. 1 is then detected. The station STA 1 outputs the data parts of the remaining channels in synchronism with a point of time where the data of the last channel Ch. 1 is inputted. In order for the station STA 1 to wait for the synchronization of the last channel Ch. 1 and then to perform next processes at the same time as described above, a buffer may be used.

Figure 6:
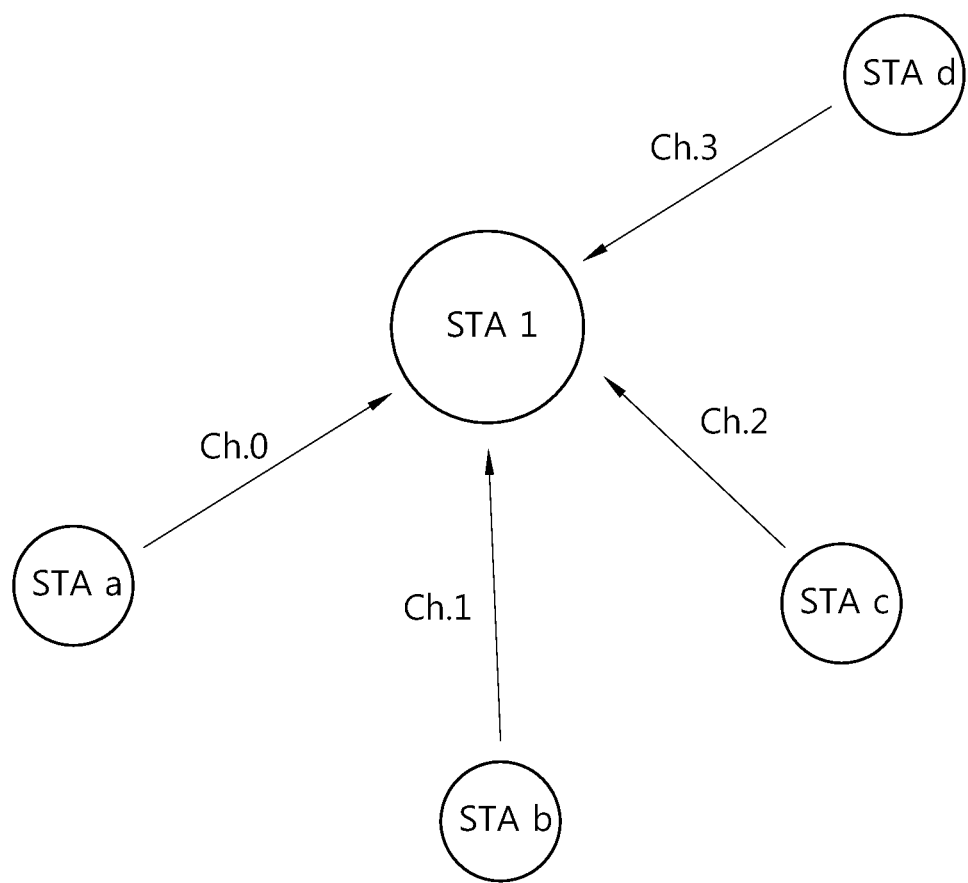
FIG. 6 is a diagram showing channels between a transmitter and a receiver according to another embodiment of the present invention.

FIG. 6 is a diagram showing channels between a transmitter and a receiver according to another embodiment of the present invention.

Referring to FIG. 6, a station STA 1 receives data from a station STA a through a channel Ch. 0, data from a station STA b through a channel Ch. 1, data from a station STA c through a channel Ch. 2, data from a station STA d through a channel Ch. 3. That is, the station STA 1 receives the data through a total of the four channels. It is here assumed that the channels of the stations STA a, STA b, STA c, and STA d are the same as those of FIG. 7 and the signal streams of the channels have different Repetition Patterns (RPs) 0, RP1, RP2, and RP3. In this case, the station STA 1 has to have known periodicity for the repetition patterns RP0 to RP3.

Figure 7:
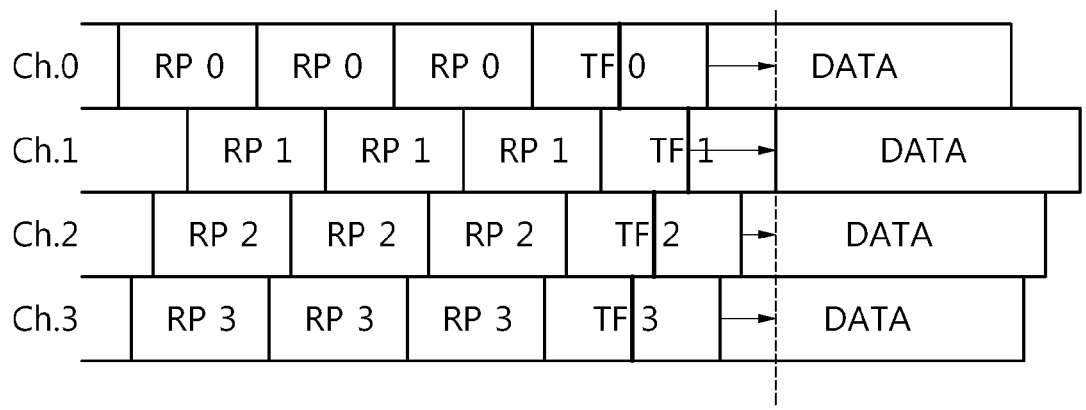
FIG. 7 is a conceptual diagram illustrating a scenario for acquiring the synchronization points of data received through a plurality of channels according to another embodiment of the present invention.

In FIG. 7, the station STA 1 cumulatively calculates an add-sum, a sub-sum, and an add-sub-sum according to a lapse of time during one period for every channel and tracks an estimated synchronization point by comparing and analyzing the add-sum, the sub-sum, and the add-sub-sum. For example, if the repetition pattern of a signal stream is ended at the last repetition pattern RP1 in the channel Ch. 1, the station STA 1 can find an estimated synchronization point (ESP) 1 for the channel Ch. 1 in a Training Field (TF) 1 section. The station STA 1 cumulatively calculates the add-sum, the sub-sum, and the add-sub-sum of the different repetition pattern adaptively according to a lapse of time for every channel and finds an estimated synchronization point (ESP) of each channel.

In the sequence of synchronization detected, after synchronization of the channel Ch. 0 is detected, synchronization of the channel Ch. 3 and the channel Ch. 2 are detected, and synchronization of the last channel Ch. 1 is then detected. The station STA 1 outputs the data parts of the remaining channels in synchronism with a point of time where the data of the last channel Ch. 1 is inputted. In order for the station STA 1 to wait for the synchronization of the last channel Ch. 1 and then to perform next processes at the same time as described above, a buffer may be used.

Figure 8:
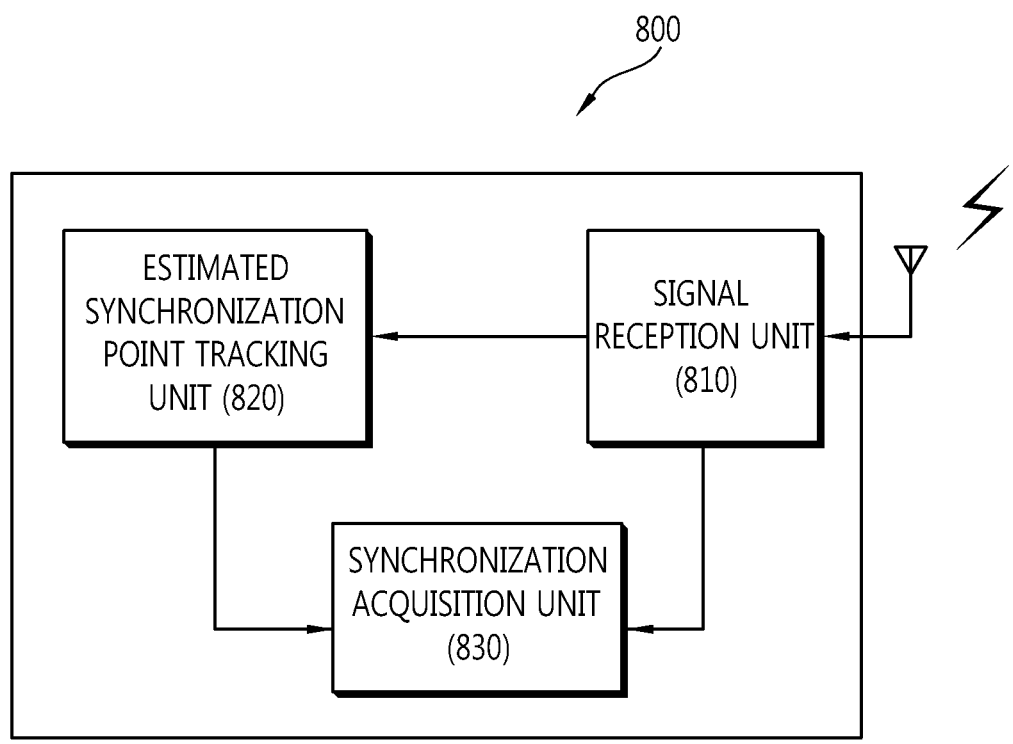
FIG. 8 is a block diagram of a synchronization acquisition apparatus according to an embodiment of the present invention.

FIG. 8 is a block diagram of a synchronization acquisition apparatus according to an embodiment of the present invention.

Referring to FIG. 8, the synchronization acquisition apparatus 800 includes a signal reception unit 810, an estimated synchronization point tracking unit 820, and a synchronization acquisition unit 830.

The signal reception unit 810 receives information about the repetition patterns of signal streams for every channel and receives the signal stream and data fro each channel. The information about the repetition patterns of signal streams may be information indicative of their periodicity in the case where signal streams having a specific periodicity are repeated in each channel. Alternatively, the information about the repetition patterns of signal streams may be a characteristic of each channel or information about each channel.

The estimated synchronization point tracking unit 820 cumulatively calculates an add-sum, a sub-sum, and an add-sub-sum of the signal streams according to a lapse of time during one period on the basis of the repetition patterns of the signal streams and tracks an estimated synchronization point by comparing and analyzing the add-sum, sub-sum, and add-sub-sum for every channel. A method of the estimated synchronization point tracking unit 820 calculating the add-sum, the sub-sum, and the add-sub-sum of the signal streams may be performed using, for example, Equations 1 to 5. The estimated synchronization point tracking unit 820 determines a point of time at which the sub-sum is identical to the add-sub-sum as the estimated synchronization point.

Meanwhile, the estimated synchronization point tracking unit 820 determines whether the sub-sum of each channel has a positive slope according to a lapse of time and increases a slope count for a channel, having the sub-sum of a positive slope, by 1. After the estimated synchronization point for a corresponding channel is found, the estimated synchronization point tracking unit 820 determines a first point where the repetition signal streams are ended or a second point where new signal streams are ended on the basis of the estimated synchronization point and the slope count of the corresponding channel. For example, assuming that in a channel A, a slope count in an estimated synchronization point is $S_A$ and new signal streams are LTF CP and LTF1, the end of the new signal stream LTF1 (that is, end of LTF1) may be found using Equation 7 below.

$$\text{end of LTF1} = \text{LTF1} + \text{LTF } CP - S_A \quad \text{[Equation 7]}$$

The synchronization acquisition unit 830 acquires a synchronization point for each channel on the basis of the first or second point determined by the estimated synchronization point tracking unit 820. The synchronization acquisition unit 830 may further include a buffer (not shown) for storing data for each of the channels until the synchronization point is acquired.

As described above, according to the present invention, the performance of synchronization acquisition in a multi-channel environment can be improved. Although the value of data of repeated signal streams is not known, synchronization can be acquired by using only the length of one period, thereby being capable of simplifying a synchronization acquisition procedure. Furthermore, the configuration of hardware can be simplified by using only the addition and subtraction of signals in a system configuration.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. An apparatus for acquiring synchronization in a multi-channel system, comprising:
    a signal reception unit for receiving information about repetition patterns of signal streams for each channel and receiving the signal streams and data from the channel;
    an estimated synchronization point tracking unit for determining a estimated synchronization point for the channel from a point of time where the repetition patterns are ended by tracking a period where the signal streams are repeated based on the repetition patterns; and
    a synchronization acquisition unit for searching, based on the estimated synchronization point related to the channel, for a point where the repetition of the signal stream is ended or a point where new signal streams are started and acquiring a synchronization point based on the point.

2. The apparatus of claim 1, wherein the information about the repetition patterns of the signal streams comprises information, informing a specific periodicity in case where the signal streams in the channel are repeatedly transmitted with the specific periodicity.

3. The apparatus of claim 1, wherein the estimated synchronization point tracking unit calculates, during the period, an add-sum of the signal streams, a sub-sum of the signal streams, and an add-sub-sum that is a difference between the add-sum and the sub-sum and tracks the estimated synchronization point for the channel by comparing the sub-sum and the add-sub-sum.

4. The apparatus of claim 3, wherein the estimated synchronization point tracking unit determines whether the sub-sum has a positive slope, increases a slope count for a channel having the positive slope by 1, and determines a point of time where the sub-sum is identical to the add-sub-sum as the estimated synchronization point.

5. The apparatus of claim 1, wherein the signal streams comprise Short Training Fields (STFs).

6. The apparatus of claim 1, wherein the new signal streams comprise Long Training Fields (LTFs).

7. The apparatus of claim 1, wherein the synchronization acquisition unit determines a point of time where a process of the data for the channel is started based on the acquired synchronization point.

8. The apparatus of claim 6, wherein the synchronization acquisition unit further comprises a buffer for storing data for the channel until the synchronization point is acquired.

9. A method of acquiring synchronization in a multi-channel system, comprising:
receiving information about repetition patterns of signal streams for each channel;
receiving the signal streams from the channel;
determining an estimated synchronization point for the channel from a point of time where the repetition patterns are ended by tracking a period where the signal streams are repeated based on the repetition patterns; and
acquiring a synchronization point by searching, based on the estimated synchronization point related to the channel, for a point where the repetition of the signal stream is ended or a point where new signal streams are started.

10. The method of claim 9, wherein the information about the repetition patterns of the signal streams comprises information, informing a specific periodicity in case where the signal streams in the channel are repeatedly transmitted with the specific periodicity.

11. The method of claim 9, further comprising:
calculating, during the period, an add-sum of the signal streams, a sub-sum of the signal streams, and an add-sub-sum that is a difference between the add-sum and the sub-sum,
wherein the estimated synchronization point for the channel is determined by comparing the sub-sum and the add-sub-sum.

12. The method of claim 11, wherein when a slope count for a channel with the sub-sum having a positive slope is increased by 1, a point of time where the sub-sum is identical to the add-sub-sum is determined as the estimated synchronization point.

13. The method of claim 9, wherein the signal streams comprise STFs.

14. The method of claim 9, wherein the new signal streams comprise LTFs.

15. The method of claim 9, wherein a point of time where a process of the data for the channel is started is determined based on the acquired synchronization point.

16. The method of claim 15, further comprising:
storing data for the channel until the synchronization point is acquired.

17. The method of claim 11, wherein the add-sum is an add-sum of power of the signal streams and the sub-sum is a sub-sum of power of the signal streams.

18. The method of claim 9, wherein the information about the repetition patterns of the signal streams comprises information about the channel.

19. A method of acquiring synchronization in a multi-channel system, comprising:
receiving signal streams from a plurality of stations through different channels, wherein the channels of the stations have different repetition patterns of the signal streams;
calculating, during one period, an add-sum of the signal streams repeated, a sub-sum of the signal streams repeated, and an add-sub-sum that is a difference between the add-sum and the sub-sum;
determining a point of time where any one of the add-sum and the sub-sum is identical to the add-sub-sum as a estimated synchronization point, while calculating the add-sum, the sub-sum, and the add-sub-sum whenever the signal stream is received;
acquiring a first point where the repetition of the signal streams is ended or a second point where new signal streams are started based on the estimated synchronization point; and
acquiring a synchronization point for a processing of data, received from the plurality of stations, based on the first point or the second point.

\* \* \* \* \*